(12) United States Patent
Shortt et al.

(10) Patent No.: US 10,557,665 B2
(45) Date of Patent: Feb. 11, 2020

(54) CENTRIFUGAL PELLET DRYER

(71) Applicant: GALA INDUSTRIES, INC., Eagle Rock, VA (US)

(72) Inventors: Louis Cody Shortt, Vinton, VA (US); Richard Borland Thrasher, Jr., Troutville, VA (US); Kerry Patrick Morris, Troutville, VA (US)

(73) Assignee: GALA INDUSTRIES, INC., Eagle Rock, VA (US)

( * ) Notice: Subject to any disclaimer, the term of this patent is extended or adjusted under 35 U.S.C. 154(b) by 605 days.

(21) Appl. No.: 15/293,956

(22) Filed: Oct. 14, 2016

(65) Prior Publication Data
US 2018/0106537 A1   Apr. 19, 2018

(51) Int. Cl.
*F26B 5/08* (2006.01)
*F26B 5/12* (2006.01)
*F26B 17/22* (2006.01)

(52) U.S. Cl.
CPC ............... *F26B 5/08* (2013.01); *F26B 5/12* (2013.01); *F26B 17/22* (2013.01)

(58) Field of Classification Search
CPC .... F26B 5/08; F26B 5/12; F26B 17/22; F26B 2200/08; F26B 3/06; F26B 5/041; F26B 5/042; F26B 17/002; F26B 17/00; F26B 17/007; F26B 17/008; B29B 13/06; B29B 9/16; B29B 9/065
USPC ..................... 34/312, 318, 361, 92
See application file for complete search history.

(56) References Cited

U.S. PATENT DOCUMENTS

| 3,458,945 | A | 8/1969 | Edwards |
| 4,565,015 | A | 1/1986 | Hundley, III |
| 4,896,435 | A | 1/1990 | Spangler, Jr. |
| 5,245,345 | A | 9/1993 | Bonta et al. |
| 6,438,866 | B1 | 8/2002 | Meydell et al. |
| 6,467,188 | B1 | 10/2002 | Sandford |
| 6,505,416 | B2 | 1/2003 | Sandford |
| 8,365,430 | B2 | 2/2013 | Veltel et al. |
| 2002/0059991 | A1* | 5/2002 | Barrett ............... D21C 7/06 162/17 |
| 2003/0070318 | A1* | 4/2003 | Werner ............... B01J 2/16 34/576 |
| 2006/0042113 | A1* | 3/2006 | Ekart ............... F26B 5/08 34/58 |
| 2006/0080854 | A1 | 4/2006 | Mynes |
| 2010/0037477 | A1* | 2/2010 | Veltel ............... F26B 5/08 34/58 |
| 2012/0053278 | A1* | 3/2012 | Malucelli ............... B29B 9/16 524/400 |

(Continued)

FOREIGN PATENT DOCUMENTS

| DE | 3102303 | 8/1982 |
| DE | 4330078 | 3/1994 |
| DE | 60010162 | 8/2004 |

Primary Examiner — John P McCormack
(74) Attorney, Agent, or Firm — Jacobson Holman, PLLC.

(57) ABSTRACT

A centrifugal pellet dryer is provided that includes a housing accommodating a rotor surrounded by a screen, and a feeding system for feeding a water-pellet-slurry to the rotor. The feeding system includes a pre-dewatering system for separating water from the water-pellet-slurry upstream of the rotor. The pre-dewatering system may include a feeding pipe having a dewatering perforation, with the pipe being configured to be mounted in different positions to adjust the amount of dewatering.

21 Claims, 4 Drawing Sheets

(56) References Cited

U.S. PATENT DOCUMENTS

2013/0036625 A1\* 2/2013 Muerb .................... F26B 17/24
 34/587
2013/0074360 A1\* 3/2013 Pomerleau ......... B01D 33/0353
 34/406

\* cited by examiner

SECTION B-B

CENTRIFUGAL PELLET DRYER

BACKGROUND OF THE INVENTION

1. Field of the Invention

The present invention relates to a centrifugal pellet dryer comprising a housing accommodating a rotor surrounded by a screen, and a feeding system for feeding a water-pellet-slurry to said rotor, said feeding system including a pre-dewatering system for separating water from said water-pellet-slurry upstream of said rotor.

2. Description of the Related Art

Centrifugal pellet dryers of the aforementioned type may be used, for example, for drying plastic pellets which may be produced, e.g., by an underwater pelletizer where molten plastic is fed through a die plate and cut into pellets by means of a cutter head on the downstream side of said die plate underwater. The cut pellets are conveyed away from the cutting chamber by means of water flowing through a piping system. The water-pellet-slurry may be fed into such centrifugal pellet dryer to separate the water from the pellets. In the alternative to such underwater pelletizing process, other processes may produce water-pellet-slurries that can be fed to such centrifugal pellet dryers to dry the pellets or other pellet-like particles or other materials to be separated from water or other liquids.

In such centrifugal pellet dryers, a rotor rotating about an upright axis of rotation may include conveying or lifting arms or elements causing the pellets to ricochet between the lifting elements and the screen surrounding the rotor while being conveyed by centrifugal action up the drying rotor in a helical path. The water may be separated through the screen which may have a perforation and/or may form a sieve screen, and the pellets may be continuously conveyed into the upper section of the dryer where the pellets may be discharged via an outlet opening formed in the housing in which the rotor surrounded by the screen is accommodated.

The separated water may be collected in a bottom section of the housing to be discharged therefrom via a water outlet. To further remove residual surface moisture from the pellets, a dry countercurrent airflow may be generated by an external exhaust fan to float through a pellet outlet chute of the housing and/or at least an upper portion of the rotor space surrounded by the screen in a direction countercurrent to the pellets.

While such dry countercurrent airflow may remove residual surface moisture from the pellets in a downstream portion of the pellet path through the dryer, it may additionally help in separating water from the pellets to have a pre-dewatering system upstream of the rotor, wherein such pre-dewatering system may form a part of the feeding system for feeding the water-pellet-slurry to a loading area of the rotor. Such pre-dewatering system may be used to adjust the ratio of the amount of water to the amount of pellets before feeding the slurry onto the rotor and/or may provide for a rough separation of water without the action of the rotor, wherein in such pre-dewatering systems large amounts of water up to 95% of the process water may be separated from the pellets.

In known pre-dewatering systems, it is sometimes difficult to indeed separate the desired amount of water. Some residual water is necessary so as to reliably convey the pellets into the loading area of the rotor. On the other hand, a sufficient amount of water should be separated so that the rotor's drying capacity can cope with the residual water. Furthermore, depending on the architecture of the pelletizing equipment to which the dryer is to be connected, it is sometimes difficult to provide for the feeding rate and slurry velocity at which the pre-dewatering system works at high efficiency.

SUMMARY OF THE INVENTION

In view of those and other disadvantages and characteristics of the prior art, it is an objective of the present invention to provide for an improved centrifugal pellet dryer that can provide for a highly efficient drying of pellets or pellet-like substances contained in water-pellet-slurries coming from equipment of different architectures and having different water amounts and/or slurry velocities.

It is a further object underlying the invention to allow for connection of the pellet dryer to pelletizing and/or slurry feeding equipment of different architectures more easily.

A still further objective underlying the invention is to achieve easy adaption of the dewatering rate of the feeding system feeding the water slurry to the rotor of the dryer.

To achieve at least one of the aforementioned objectives, it is suggested to vary the position and/or orientation of at least one feeding pipe of the dryer's feeding system to adjust the amount of dewatering. The pre-dewatering system may include a feeding pipe having a dewatering perforation, said pipe being configured to be mounted in different positions to adjust the amount of dewatering. Such dewatering perforation may include a plurality of cutouts or holes or voids in at least a portion of a wall of said feeding pipe large enough to allow water to pass therethrough and small enough to prevent pellets from passing through. Changing the position and/or orientation of the feeding pipe changes the amount of dewatering provided by such dewatering perforation.

BRIEF DESCRIPTION OF THE DRAWINGS

These and other features become more apparent from the following description of an advantageous embodiment of the invention and the accompanying drawings as briefly described below.

DETAILED DESCRIPTION OF THE PREFERRED EMBODIMENTS

Figure 1:
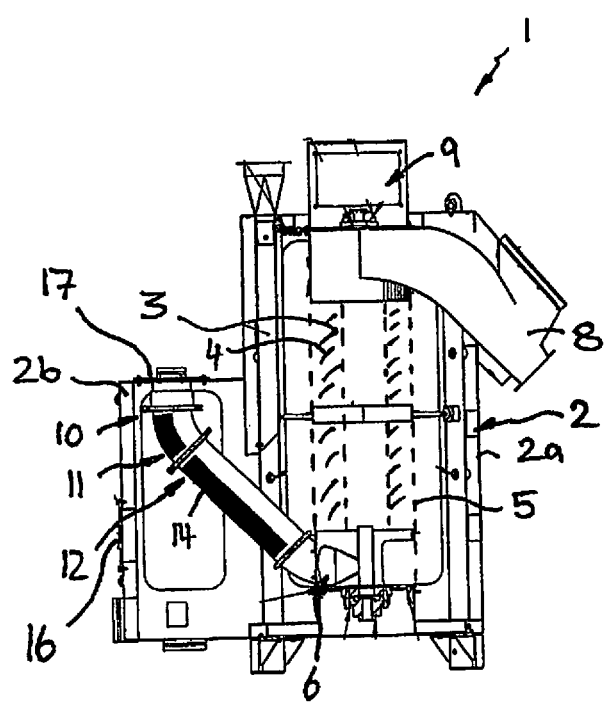
FIG. 1 is a schematic, partly cross-sectional view of a centrifugal pellet dryer according to an advantageous embodiment of the invention, wherein an upright rotor and a feed piping connected to a loading area of the rotor are shown, the feed piping being shown in a configuration connected to a vertical feed opening of the housing in which the rotor and feed piping are accommodated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

To allow for adjustment of the amount of dewatering, the pellet dryer may include a feeding system having a pre-dewatering system for separating water from the water-pellet-slurry upstream of the rotor of the dryer, wherein such pre-dewatering system may include a feeding pipe having a dewatering perforation, wherein said feeding pipe may be mounted in different positions and/or orientations inside the housing to adjust the amount of dewatering achieved through said dewatering perforations. Such dewatering perforations may include through-holes and/or cutouts and/or voids and/or longitudinal slot-like cuts and/or other perforations in a circumferential wall of the feeding pipe which are large enough to allow water to be drained, but small enough to prevent pellets from passing therethrough. More particularly, such dewatering perforations may provide for a sieve-like or net-like structure of wall portions and recesses together forming at least a portion of the circumferential wall of the feed pipe.

More particularly, said dewatering perforations may be formed by a plurality of slot-like, elongated laser cuts extending subtantially parallel to the longitudinal axis of the feed pipe. Such slot pattern allows for efficient water draining without causing turbulences and without increasing flow resistance. For example, such slot pattern may be restricted to a lower half of the feed pipe and/or the laser cuts may be distributed over the lower half pipe. For example, more than 25 or more than 50 or more than 75 slots may be provided in a cross-section of the feed pipe and distributed over the lower half pipe thereof. The width of those laser cuts may vary depending on the pellet-like substances to be fed to the dryer and typically may range from, e.g., 0.02 to 0.1 inch or from 0.04 to 0.06 inch.

So as to adjust the amount of water drained through such dewatering perforations, the feed pipe may be mounted in different orientations and/or positions so as to change the dewatering capacity of the feed pipe and/or the effective area of dewatering perforations offered to the water flowing through the feed pipe and/or the contact area of the dewatering perforations to be contacted by the water flowing through the feed pipe.

More particularly, the feed pipe may be mounted rotatably about a longitudinal feed pipe axis to make different sections of the feed pipe and/or different portions of the dewatering perforation form a bottom side of the feeding pipe. Depending on the rotatory position of the feed pipe, the dewatering perforations may be arranged on a bottom side of the feed pipe or at a top side of the feed pipe or a position therebetween. When the feed pipe is rotated into a position where the dewatering perforations are on the top side of the feed pipe, less water will be drained through the dewatering perforations, whereas in comparison more water is drained when the feed pipe is rotated into a position where the dewatering perforations are on the bottom side of the feed pipe. When the feed pipe is rotated into an intermediate position, an intermediate amount of water may be drained. Such rotatable mounting of the feed pipe is based on the theory that the amount of drained water is reduced when the dewatering perforations are shifted towards the top side of the feed pipe. In particular, when the water-pellet-slurry does not contact the entire cross-section of the feed pipe, but only a portion of the feed pipe cross-section such as the lower half of the feed pipe due to a sufficiently large cross-sectional area of the feed pipe in comparison to the slurry flow rate, the area of the dewatering perforations indeed in contact with the water-pellet-slurry changes depending on the rotatory position of the feed pipe.

Said dewatering perforations of the feed pipe may be restricted to a circumferential wall segment of the feed pipe extending substantially parallel to the longitudinal axis thereof so that said circumferential wall segment provided with the dewatering perforations may be shifted from a bottom side position to a top side position and intermediate positions therebetween when the feed pipe is rotated about its longitudinal axis. Said circumferential wall segment provided with the dewatering perforations may vary in its circumferential extension and/or may extend over varying angular portions. For example, said dewatering perforations may be provided in a wall segment extending over the cross-section from 90° to 180°. In other words, e.g., one quarter to one half of the feed pipe may be provided with such dewatering perforations. Depending on the desired dewatering capacity, also smaller strips extending over less than a quarter sector of the feed pipe may have dewatering perforations. On the other hand, also more than a half pipe may be provided with dewatering perforations.

In the alternative or in addition, the dewatering perforation may have a permeability to water that changes along the circumferential direction of the feeding pipe and/or the dewatering perforations may have different sections with different permeabilities to water wherein such different sections are positioned in different angular segments of the circumferential wall of the feeding pipe so that, depending on the desired dewatering capacity, a section with a higher permeability may be rotated into the bottom side position, or in the alternative a section with a smaller permeability may be rotated into said bottom-side position or into a position contacting the water whereas the higher permeability section is rotated out of contact with water. For example, there may be slots having a layer width on one side of the feed pipe and slots having a smaller width on another side thereof.

The aforementioned changing permeability to water generally may depend on the number and/or size and/or width of slots and/or holes and/or voids provided in a certain surface area of the feed pipe. For example, one hole per square inch may drain less water than two holes of the same hole size per square inch. On the other hand, two slots of 0.1 inch width and 10 inch length per square foot may drain more water than two slots of 0.05 inch width and 7 inch length per square foot.

More generally, the feed pipe's permeability to water may be changed by means of changing the ratio of the sum of the cross-sectional areas of the holes or slots in a section of the feed pipe wall to the area of the closed wall portions between the holes and slots in said section of the feed pipe wall. The larger the aforementioned ratio is, the higher the permeability is and the more water can be drained.

In addition or in the alternative to rotating the dewatering perforations from a bottom side to the top side, the amount of dewatering also may be adjusted by means of a feed pipe comprising an inner pipe section and an outer pipe section co-axial to each other and rotatable relative to each other. One of said inner and outer pipe sections may be provided with said dewatering perforations, whereas the other one of said inner and outer pipe sections may be provided with at least one opening that can be brought into registration with the dewatering perforations and out of registration with said dewatering perforations when the inner and outer pipe sections are rotated relative to each other. In other words, by rotation of the inner and outer pipe sections relative to each other, the opening area of the dewatering perforations may be changed. When the inner and outer sections are rotated so that the dewatering perforations in the one pipe section is in registration with the opening in the other pipe section, the maximum dewatering capacity may be achieved. On the other hand, if the inner and outer pipe sections are rotated to partly or fully bring the dewatering perforations out of registration with the opening, the dewatering capacity is partly or fully restricted.

For example, an inner pipe section may be provided with dewatering perforations in a bottom-side portion of said inner pipe section which may be arranged in a fixed rotatory position. An outer pipe section forming a sleeve-like outer pipe wall surrounding the inner pipe section may be provided with a large drainage opening such as an elongated, slot-like recess and may be rotatably supported. When said outer sleeve is rotated into a position where the slot-like recess is aligned with the dewatering perforations, water may be drained, whereas no water may be drained when the slot-like recess is rotated into a position not aligned with said dewatering perforations.

In addition or in the alternative to rotating the feed pipe about its longitudinal axis, said feed pipe may be mounted adjustably in its slope. To adjust the amount of dewatering, the slope of the feed pipe having the dewatering perforations, may be changed. Generally, the feed pipe may be brought into a steeper orientation to reduce the amount of dewatering and/or may be brought into a more horizontal, less inclined or less upright position to increase dewatering. Bringing the feed pipe into a more upright position will increase the velocity of the water pellet slurry and decrease the residual time thereof in the feed pipe, thereby reducing the amount of dewatering. On the other hand, when the feed pipe is brought into a more horizontal position, the water-pellet-slurry flows more slowly through the pipe so that more water may be drained.

To adjust the amount of dewatering, the dryer also may include—in addition or in the alternative to the aforementioned measures—a suction device for applying low pressure and/or partial vacuum to the feed pipe's perforations, thus actively removing water from the feed pipe through said perforations by means of sucking action. For example, a suction air device may include a suction head positioned at the feed pipe's perforations and/or surrounding the outer surface of the feed pipe to encompass the perforations to apply suction air or vacuum to the perforations.

More particularly, said suction air device may cooperate with the aforementioned outer pipe section forming a sleeve-like outer pipe wall surrounding the inner pipe section having the perforations. For example, said outer pipe section may be configured to provide for a gap or spacing between the inner and outer pipe sections, wherein the outer pipe section may have a closed circumferential wall, for example, so that the suction air device may be connected to one of the end portions of said outer pipe section. For example, the outer pipe section, at its lower end portion, may be connected to the suction hose of such suction air device.

Adjustments of the amount of dewatering already may be achieved by means of switching on and switching off the suction air device. To allow for finer adjustments, said suction air device may be configured for adjusting the suction pressure, wherein, for example, the rotational speed of a suction fan may be varied or the cross-sectional area of a suction intake and/or suction exhaust opening may be varied.

In addition or in the alternative, other operating parameters of the suction air device may be varied to adjust the amount of dewatering. For example, the suction device may be configured to increase or decrease flow rate and/or air flow velocity and/or throughput.

In addition or in the alternative, the suction device may be configured to vary geometrical parameters such as the effective area in which a suction head is applying suction air to the feed pipe's perforations. For example, when the aforementioned sleeve-like outer pipe section is used to suck water through the perforations, said sleeve-like outer pipe section may be mounted slidably on the inner feed pipe section so that it may be displaced into a feed pipe section where it has no overlap with the perforations or into a position where it has fully overlapped with the perforations or into an in-between position where it has a partly overlap with the perforations. In addition or in the alternative, the suction head may be configured to allow adjustment of the width of a gap between the suction head and the feed pipe. For example, when the suction head includes a half-pipe suction element, such half-pipe suction element may be supported movably to allow for positioning of the half-pipe suction element closer to the circumferential wall of the feed pipe or further away therefrom.

In order to allow for connection of the dryer to pelletizing or feeding equipment of different architectures and/or to achieve different amounts of dewatering, the housing of the dryer may include a horizontal feed opening and a vertical feed opening, wherein the feed piping for feeding the water-pellet-slurry to a loading area of the rotor may be configured to be switchable from a first configuration connecting the horizontal feed opening to the rotor and switchable into a second configuration connecting said vertical feed opening to said rotor. Said switchable feed piping may be arranged within said housing and may be configured to allow for either the vertical feed opening connected to the rotor or the horizontal feed opening connected to the rotor so that the vertical feed opening is blocked from the rotor when the horizontal feed opening is connected and vice versa the horizontal opening is blocked when the vertical feed opening is connected to the rotor.

More particularly, the feed piping may include a feed pipe that can be mounted to either the vertical feed opening or the horizontal feed opening of the housing, wherein in either position the feed pipe can be connected to the loading area of the rotor.

To allow for such reconfiguration of the feed piping, said feed pipe may include a flexible and/or bending portion such as a plastic hose portion. In the alternative or in addition, the horizontal feed opening and the vertical feed opening may be positioned relative to each other and relative to the rotor's loading area in such a way that a substantially rigid feed pipe may be mounted to either one of said horizontal and vertical feed openings, wherein the substantially rigid feed pipe may have a shape allowing to mount the feed pipe in different orientations to bridge the path between the horizontal feed opening to the loading area or the path from the vertical feed opening to the loading area. For example, the feed pipe may include at least one bent or curved pipe portion allowing to bring the feed pipe into different positions and/or orientations depending on the orientation and/or the positioning of said bent portion.

Advantageously, the vertical feed opening may be positioned above the horizontal feed opening so that a feeding path from said vertical feed opening to the loading area of the rotor is steeper than a feeding path from the horizontal feed opening of the housing to the loading area of the rotor.

For example, the horizontal feed opening of the housing may be positioned substantially at the level or height of the loading area of the rotor or slightly above the level of the rotor so that the feed path from the horizontal feed opening to the loading area is substantially horizontal or slightly inclined to a horizontal line at an angle of less than 15° or less than 10° or less than 5°, when considering said feed path to be a straight line. Said feed path does not necessarily have to be a straight line, but may include steeper and less steep sections, but nevertheless may be a substantially straight line.

On the other hand, the vertical feed opening may be positioned relative to the loading area so that a feed path from the vertical feed opening to said loading area may be inclined to a vertical line at an angle of less than 60° or less than 45° or less than 30°, when considering said feed path to be a straight line what is not necessarily the case but may be the case depending on the shape and contour of the feed pipe.

As can be seen from FIG. 1, the centrifugal pellet dryer 1 may include a housing 2 that may have a tower-like central portion 2a in which a rotor 3 is accommodated. Said rotor 3 may have an upright, substantially vertical axis of rotation and may include a plurality of lifting elements 4 extending at least in part spaced apart from said axis of rotation, wherein such lifting elements 4 may be configured to have inclined lifting surfaces functioning as paddles or shovels or buckets conveying the pellets up the rotor 3.

Said rotor 3 may be surrounded by a screen 5 which may have a substantially cylindrical shape surrounding the rotor 3, wherein said screen 5 may comprise several screen sections or screen elements. Said screen 5, at least in part, may have a sieve-like or net-like configuration with a plurality of perforations allowing water to be drained through said screen. For example, the screen 5 may be formed by a plurality of porous, sheet-like screen members fastened to screen carrier hoops by means of tensioning belts as it is known per se.

As can be seen from FIG. 1, the rotor 3, at a lower section or bottom section, may have its loading area where water-pellet-slurry is fed onto the rotor 3, wherein said loading area 6 may be formed by a base portion of the rotor unit surrounding the rotatable rotor 3 and the lifting elements 4 thereof. As can be seen from FIG. 2, said base portion 7 may include a ring element or sleeve element to which the screen 5 can be connected.

At an upper portion, the housing 2 may include a pellet outlet 8 which may form a chute for discharging dried pellets, wherein such pellet outlet 8 may be connected to an outlet opening in the uppermost screen portion to substantially radially discharge the pellets from the rotor 3.

As shown by FIG. 1, an airflow generator 9 may be provided on top of the housing 2 so as to generate a dry airflow helping to remove residual moisture from the pellets, wherein such dry airflow may be generated to be countercurrent airflow flowing into the housing 2 through the pellet outlet 8 and/or to flow in the housing downwards along the rotor 3, more particularly in the interior space between the screen 5 and the rotor 3.

As shown by FIG. 1, the housing 2 may include a side portion 2b accommodating a feeding system 10 for feeding water-pellet-slurry to the loading area 6 of the rotor 3. More particularly, said feeding system 10 may include a feed piping 11.

Said feed piping 11, at one end, is connected to the aforementioned base portion 7 of the rotor unit forming the loading area thereof, and, at another end, connected to a feed opening formed in the housing 2. As can be seen from FIG. 1, the side portion 2b of the housing 2 includes a vertical feed opening 17 and a horizontal feed opening 16, wherein said horizontal feed opening 16 is formed in an upright side wall of said housing side portion 2c substantially at the height of the loading area of the rotor 3. On the other hand, the vertical feed opening 17 may be formed in a top wall portion of said housing side portion 2b, wherein the vertical feed portion 17 may be positioned above the horizontal feed opening 16. The terms horizontal feed opening and vertical feed opening have been chosen to indicate that the horizontal feed opening allows for a slurry inlet into the housing 2 and the feed piping system therein in a substantially horizontal direction, whereas the vertical feed opening allows for feeding the water-pellet-slurry into the housing from above in a substantially vertical direction.

Figure 2:
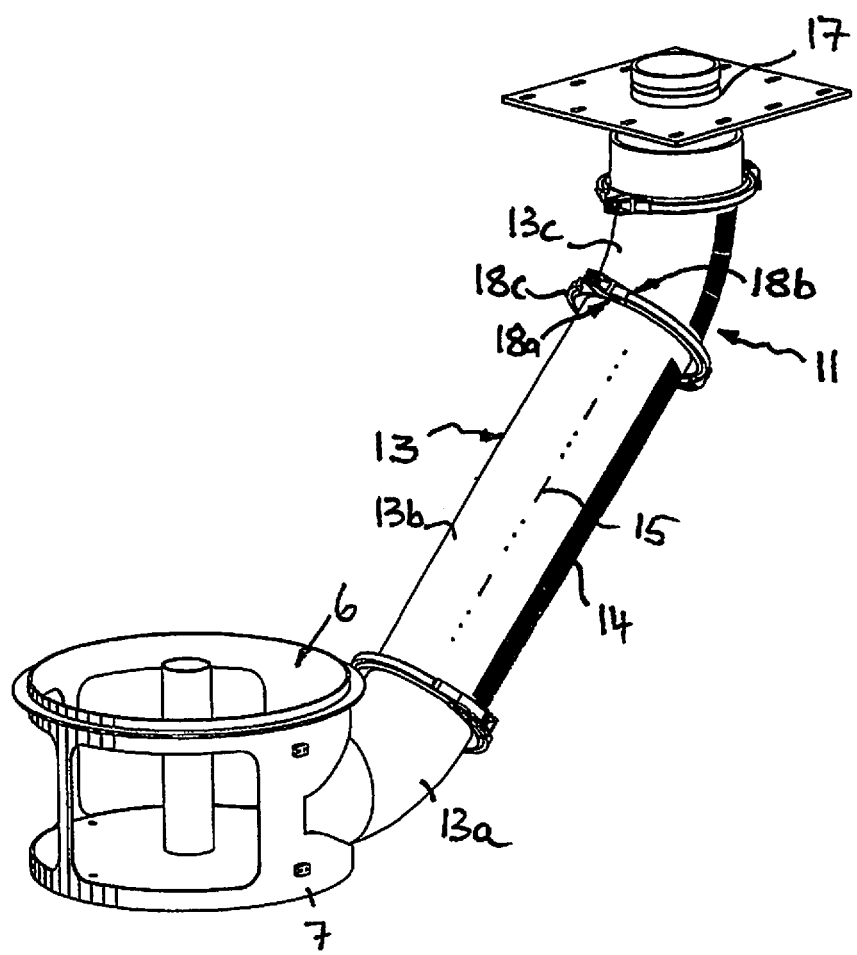
FIG. 2 is a perspective, exploded view of the feed piping of FIG. 1 showing the pipe connectors allowing for rotation of a perforated feed pipe.

As can be seen from FIG. 2, the feed piping 11 includes a feed pipe 13 which comprises a first curved section 13a connected to a straight section 13b and a second curved section 13c connected to said straight section 13b. The first curved section 13a may be rigidly connected to the base portion 7 forming the loading area of the rotor unit, wherein a connector flange of said first curved section 13a to which the next pipe section is connected, may be inclined to a horizontal line to face upwards substantially towards the vertical feed opening 17. For example, the first curved section 13a may extend over a 45° curve or a 30° curve or a 65° curve or somewhat therebetween.

The second curved section 13c also may extend over a 45° curve or a 30° curve or a 60° curve or somewhat therebetween, wherein advantageously both the first and second curved sections 13a and 13c together define a substantially 90° turn or curve.

To connect the vertical feed opening 17 to the load area of the rotor 3, the straight pipe section 13b may be connected to the first curved section 13a to extend upwardly in an inclined manner towards the vertical feed opening 17. The second curved pipe section 13c connects the straight section 13b to the vertical feed opening 17.

Figure 3:
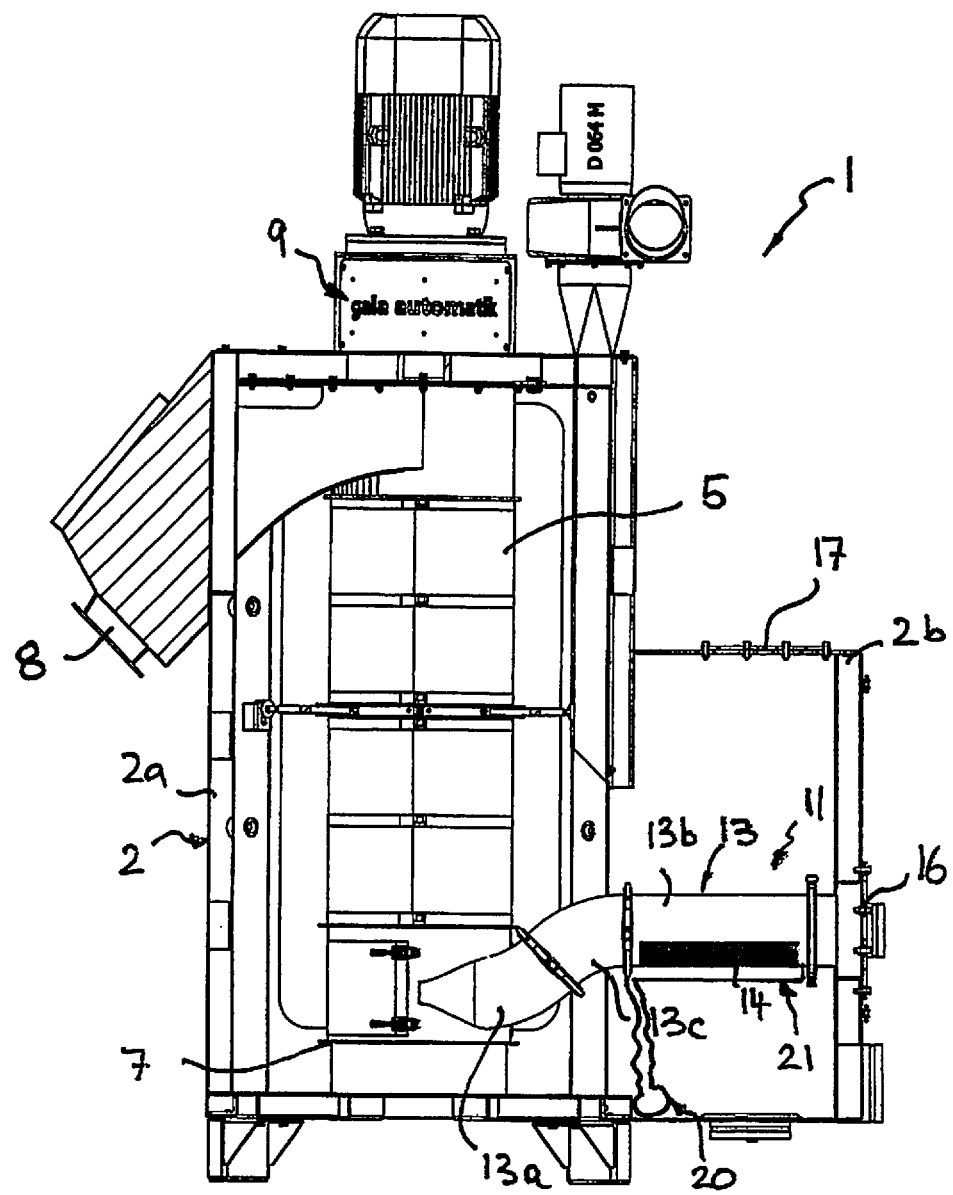
FIG. 3 is a schematic, partly cross-sectional view of the pellet dryer similar to FIG. 1, wherein the feed piping is shown in a second configuration connecting a horizontal feed opening of the housing to the rotor's loading area.

As can be seen from FIG. 3, said feed pipe 13, more particularly its straight section 13b and the second curved section 13c may be turned and mounted in an opposite orientation, i.e. the second curved section 13c may be mounted to the first curved section 13a so that the straight section 13b extends substantially horizontally towards the horizontal feed opening 16.

Advantageously, the length of the feed pipe 13 and the shape thereof are adapted to the positioning of the vertical feed opening 17 and the horizontal feed opening 16 so that the same feed pipe 13 may be used to connect selectively either the vertical feed opening 17 or the horizontal feed opening 16 to the loading area of the rotor 3.

Said feed pipe 13, in particular its straight section 13b and its second curved section 13c may be provided with a dewatering system 12 comprising dewatering perforations 14. Said dewatering perforations 14 may be provided in a half pipe segment of said pipe sections, wherein the perforations 14 may be distributed over, e.g., a 90° cross-sectional segment of the feed pipe 13, wherein the perforations 14 may be provided substantially along the entire length of said segments 13b and 13c.

Figure 4A:
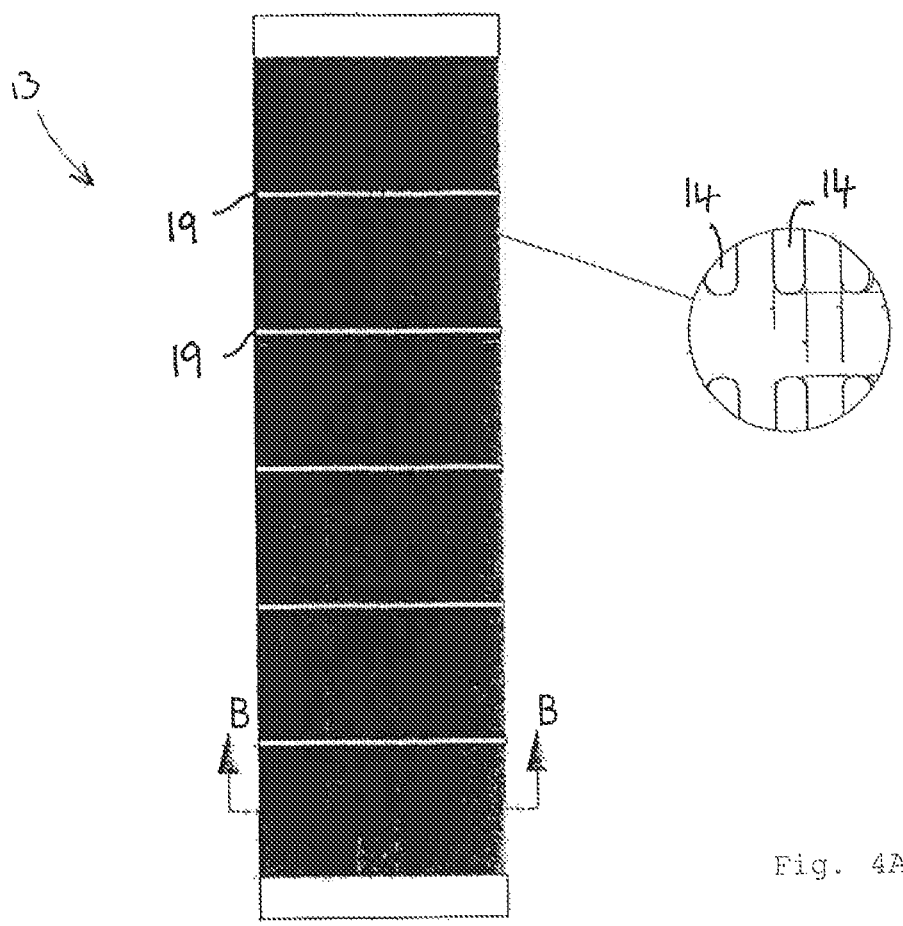
FIG. 4A is a schematic view of laser-cut dewatering perforations of the feed pipe.

As can be seen from FIG. 4, said dewatering perforations 14 may be formed as laser cuts in terms of small, elongated slots extending substantially parallel to the longitudinal axis of the feed pipe 13 and, thus substantially parallel to the flow direction through said feed pipe 13. For example, such laser cut slots each may have a width of 0.05 inch. For example, in a cross-section a number of 50 to 150 slots may be provided.

Figure 4B:
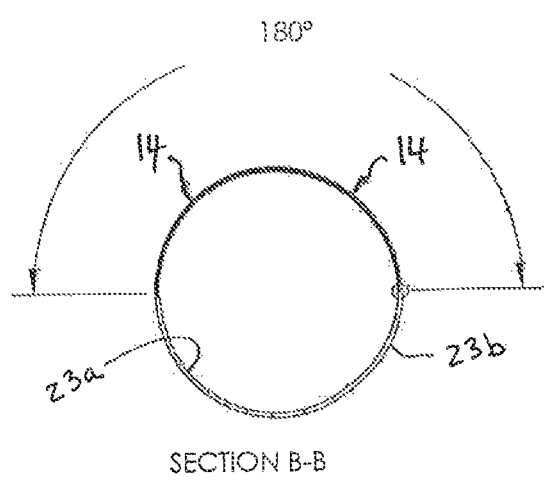
FIG. 4B is a cross sectional view taken along line B-B of FIG. 4A showing the inner and outer pipe sections.

To avoid weakening the feed pipe 13 too much, the elongated slots may be interrupted and/or a plurality of sets of longitudinal slots maybe provided one after the other along the longitudinal extension of the feed pipe 13. As can be seen from FIG. 4A, the feed pipe 13 may include transverse, small bridging portions 19 interrupting the longitudinal slots. FIG. 4B shows the inner pipe section 23*a* and outer pipe section 23*b* of the feed pipe 13 that are coaxial and rotatable with respect to each other to change the opening area of the dewatering perforations 14.

To adjust the amount of dewatering, the feed pipe 13, in particular its straight section 13*b*, may be rotated about the longitudinal pipe axis 15 so as to position the dewatering perforations 14 at a bottom side or at a top side of the feed pipe or at an intermediate position therebetween. To allow for rotation of the straight feed pipe section 13*b*, said feed pipe section 13*b* may be connected to the neighboring feed pipe sections via a pair of connector flanges 18*a* and 18*b* which may be pressed onto each other face to face.

Clampening means may be provided so as to press-fit said connector flanges 18*a* and 18*b* onto each other, wherein such clamping means may include a tensioner 18*c* in terms of a ring-shaped cramp or clasp that may be positioned over said flanges 18*a* and 18*b*. More particularly, said ring-shaped clamps or clasps 18*c* may include a groove in its inner circumferential surface, said groove fitting onto said pair of flanges in a wedge-like manner so that adjusting the diameter and/or adjusting the circumferential length of said ring-shaped clamps or clasps causes the flanges 18*a* and 18*b* to be pressed onto each other. The tensioner 18*c* together with the flanges 18*a* and 18*b* may form a wedge-like clamping structure, wherein, e.g., the inner groove of the tensioner may have inclined, wedge-like surfaces to achieve axial press-fitting of the flanges 18*a* and 18*b*.

When loosening said tensioner 18*c*—for example by means of loosening a screw or opening a clamping lever—the pipe section 13*b* may be rotated relative to the other pipe sections 13*a* and 13*c*, wherein fastening the tensioner 18*c* again freezes the rotatory position of the feed pipe 13.

To adjust the amount of dewatering, a suction device 20 may be associated with the aforementioned feed piping 11, cf. FIG. 3. More particularly, said suction device 20 may provide for low pressure and/or partial vacuum and/or vacuum to be applied to the perforations 14 in the feed pipe 13.

Such vacuum or suction device 20 may include a suction head 21 which may at least partly surround said feed pipe 13 in the region of the perforations 14 thereof. More particularly, such suction head 21 may be formed as a sleeve-like outer pipe surrounding the feed pipe 13 or as a channel-type chute or a half-pipe fluid neighboring the perforations 14 of the feed pipe 13. For example, such sleeve-like outer pipe forming the suction head 21 may surround at least a portion of the feed pipe 13, wherein such outer pipe may have a closed wall and an open end to which vacuum or low pressure is applied, thus sucking water out of the feed pipe 13 through the perforations 14.

Such suction device 20 may include, e.g., an exhaust fan or a vacuum pump such as a water ring pump to generate the suction effect.

To allow for fine adjustment of the amount of dewatering, said suction device 20 may be configured to allow for variation of the suction pressure.

In addition or in the alternative, the suction device 20 may be configured to allow for variation of the flow rate and/or flow speed and/or throughput of the suction air-water-mixture that is sucked from the feed pipe through the perforations therein. In the addition or in the alternative, the aforementioned suction head 21 may be configured to be adjusted in position, wherein e.g. it can be positioned further away or closer to the perforations and/or can be brought into positions allowing for different overlap with said perforations 14.

In the alternative to such suction head 21 directly associated with the feed pipe 13, it also would be possible to have the suction pressure applied to the entire housing section 2*b*.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A centrifugal pellet dryer, comprising a housing accommodating a rotor surrounded by a screen, and a feeding system for feeding a water-pellet-slurry to said rotor, said feeding system including a pre-dewatering system for separating water from said water-pellet-slurry upstream of said rotor, said pre-dewatering system including a feed pipe having at least one dewatering perforation, said feed pipe being mounted rotatably about a longitudinal axis thereof to make different sections of the feed pipe and/or different portions of the at least one dewatering perforation form a bottom side of the feed pipe to adjust the amount of dewatering in said pre-dewatering system.

2. The centrifugal pellet dryer according to claim 1, wherein said at least one dewatering perforation is restricted to a circumferential wall segment of the feed pipe extending substantially parallel to the longitudinal axis thereof.

3. The centrifugal pellet dryer according to claim 1, wherein said at least one dewatering perforation has a permeability to water that changes along a circumferential direction of the feed pipe and/or has different sections with different permeabilities positioned in different angular segments of a circumferential wall of the feed pipe.

4. The centrifugal pellet dryer according to claim 1, wherein said feed pipe includes an inner pipe section and an outer pipe section co-axial to each other and rotatable relative to each other, one of said inner and outer pipe sections being provided with said at least one dewatering perforation and another one of said inner and outer pipe sections being provided with at least one opening to be brought into and out of registration with said at least one, dewatering perforation by rotation of the inner and outer pipe sections relative to each other to change an opening area of said at least one dewatering perforation.

5. The centrifugal pellet dryer according to claim 1, wherein said feed pipe is mounted adjustably in its slope, said feed pipe being brought into a steeper orientation to reduce the amount of dewatering or being brought into a more horizontal, less inclined orientation to increase the amount of dewatering.

6. The centrifugal pellet dryer according to claim 1, wherein the housing includes a horizontal feed opening and a vertical feed opening, wherein the feeding system includes a feed piping configured to be switched from a first configuration connecting said horizontal feed opening to the rotor into a second configuration connecting said vertical feed opening to said rotor and vice versa from said second configuration into said first configuration.

7. The centrifugal pellet dryer according to claim 6, wherein said vertical feed opening is positioned above said horizontal feed opening so that a feeding path from said vertical feed opening to said rotor is steeper than a feeding path from said horizontal feed opening to said rotor.

8. The centrifugal pellet dryer according to claim 6, wherein said feed piping is formed by a substantially rigid feed pipe including at least one curved or bent pipe portion configured to be connected selectively to another curved pipe section or one of said horizontal and vertical feed openings.

9. The centrifugal pellet dryer according to claim 1, wherein said feed pipe includes a substantially straight feed pipe section which, with each of its end portions, is connected to a connecting pipe section by means of a rotatable connector allowing for rotation of said straight pipe section about a longitudinal axis thereof relative to neighboring connecting pipe sections.

10. The centrifugal pellet dryer according to claim 9 wherein said rotatable connector includes a pair ring-shaped flanges and a tensioner for press-fitting said pair of ring-shaped flanges onto each other.

11. The centrifugal pellet dryer according to claim 10, wherein said pair of ring-shaped flanges are configured to be press-fitted onto each other in any rotatory orientation relative to each other, wherein said tensioner includes a tensioning ring having an inner circumferential surface with a groove therein, said groove fitting onto said pair of ring-shaped flanges, said tensioning ring having an adjustable diameter and/or an adjustable circumferential length.

12. The centrifugal pellet dryer according to claim 10, wherein said feeding system including the pre-dewatering system is accommodated inside said housing.

13. The centrifugal pellet dryer according to claim 1, wherein said at least one dewatering perforation of said feed pipe includes a plurality of laser cuts forming through-holes and/or slots in a circumferential pipe wall.

14. The centrifugal pellet dryer according to claim 1, wherein said at least one dewatering perforation includes a plurality of elongated slots extending substantially parallel to the longitudinal axis of the feed pipe and/or substantially parallel to a flow direction through said feed pipe.

15. The centrifugal pellet dryer according to claim 14, wherein said plurality of elongated slots include 50 to 150 slots having a width ranging from 0.01 to 0.1 inch which are provided in cross-section of a half pipe segment of said feed pipe.

16. The centrifugal pellet dryer according to claim 1, wherein a suction device is provided for applying a suction pressure to said at least one dewatering perforation in the feed pipe to suck water out of the feed pipe through said at least one perforation therein.

17. The centrifugal pellet dryer according to claim 16, wherein said suction device is configured to allow for variation of the suction pressure to adjust the amount of dewatering.

18. The centrifugal pellet dryer according to claim 16, wherein said suction device is configured to allow for variation of a flow rate and/or throughput and/or flow speed to adjust the amount of dewatering.

19. The centrifugal let dryer according to claim 16, wherein said suction device includes a suction head including a sleeve-like outer pipe or half pipe at least partly surrounding the feed pipe and connected to a suction pressure source.

20. A centrifugal pellet dryer comprising a housing accommodating a rotor surrounded by a screen, and a feeding system for feeding a water-pellet-slurry to said rotor, said feeding system including a pre-dewatering system for separating water from said water-pellet-slurry upstream of said rotor, said pre-dewatering system including a feed pipe having at least one dewatering perforation, said feed pipe being configured to be mounted in different positions and/or different orientations to adjust the amount of dewatering, said feed pipe including an inner pipe section and an outer pipe section co-axial to each other and rotatable relative to each other, one of said inner and outer pipe sections being provided with said at least one dewatering perforation and another one of said inner and outer pipe sections being provided with at least one opening to be brought into and out of registration with said at least one dewatering perforation by rotation of the inner and outer pipe sections relative to each other to change an opening area of said at least one dewatering perforation.

21. A centrifugal pellet dryer comprising a housing accommodating a rotor surrounded by a screen, and a feeding system for feeding a water-pellet-slurry to said rotor, said feeding system including a pre-dewatering system for separating water from said water-pellet-slurry upstream of said rotor, said pre-dewatering system including a feed pipe having at least one dewatering perforation, said feed pipe being configured to be mounted in different positions and/or different orientations to adjust the amount of dewatering, said feed pipe including a substantially straight feed pipe section which, with each of its end portions, is connected to a connecting pipe section by means of a rotatable connector allowing for rotation of said straight pipe section about a longitudinal axis thereof relative to neighboring connecting pipe sections, said rotatable connector including a pair of ring-shaped flanges and a tensioner for press-fitting said pair of ring-shaped flanges onto each other.

\* \* \* \* \*